(12) United States Patent
Gerard et al.

(10) Patent No.: US 8,587,174 B2
(45) Date of Patent: Nov. 19, 2013

(54) ROTOR ASSEMBLY AND METHOD OF MANUFACTURING A ROTOR ASSEMBLY

(75) Inventors: Dale A. Gerard, Bloomfield Hills, MI (US); Qigui Wang, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 471 days.

(21) Appl. No.: 12/954,115

(22) Filed: Nov. 24, 2010

(65) Prior Publication Data

US 2012/0126657 A1    May 24, 2012

(51) Int. Cl.
*H02K 17/00* (2006.01)
*H02K 17/30* (2006.01)
*H02K 19/14* (2006.01)
*H02K 23/60* (2006.01)

(52) U.S. Cl.
USPC .............. 310/125; 310/211; 310/212; 29/598

(58) Field of Classification Search
USPC ................... 310/211, 212, 125, 124, 156.78, 310/156.79, 156.81, 156.82, 156.83, 310/156.84; 29/596, 598
See application file for complete search history.

(56) References Cited

U.S. PATENT DOCUMENTS

| | | | | |
|---|---|---|---|---|
| 2,784,333 | A * | 3/1957 | Gunselman | 310/211 |
| 4,331,895 | A * | 5/1982 | Edick et al. | 310/61 |
| 5,389,847 | A * | 2/1995 | Nakamura et al. | 310/197 |
| 2012/0126656 | A1* | 5/2012 | Gerard et al. | 310/211 |
| 2012/0210563 | A1* | 8/2012 | Wang et al. | 29/598 |

FOREIGN PATENT DOCUMENTS

JP    04351451    * 7/1992 ............ H02K 17/16

OTHER PUBLICATIONS

Machine translation of abstract of JP04351451, Nishimura, Jul. 1992.*

* cited by examiner

*Primary Examiner* — Terrance Kenerly
(74) *Attorney, Agent, or Firm* — Quinn Law Group, PLLC

(57) ABSTRACT

A rotor assembly for an electric device includes a laminated stack of electric steel sheets defining a plurality of longitudinally extending grooves. A conductor bar is disposed within each of the grooves. Each of the conductor bars includes a first end and a second end extending longitudinal outward from opposing axial end surfaces of the laminated stack. The first end and the second end of the conductor bars include a textured surface having micro-sized surface irregularities. A first end ring is cast in place over the first ends of the conductor bars, and a second end ring is cast in place over the second ends of the conductor bars. The textured surface in the first ends and the second ends of the conductor bars mechanically interlocking with the cast in place first end ring and second end ring respectively.

16 Claims, 3 Drawing Sheets

ROTOR ASSEMBLY AND METHOD OF MANUFACTURING A ROTOR ASSEMBLY

TECHNICAL FIELD

The invention generally relates to a rotor assembly for an electric device, and to a method of manufacturing the rotor assembly.

BACKGROUND

Rotor assemblies for an electric device, including but not limited to an induction electric motor, typically include a laminated stack of electric steel sheets that support a plurality of conductor bars disposed within longitudinal grooves defined by the laminated stack of electric steel sheets. The conductor bars extend outward beyond axial end surfaces of the laminated stack of electric steel sheets. The rotor assembly includes a first end ring and a second end ring disposed at the opposite axial end surfaces of the laminated stack of electric steel sheets. The first end ring and the second end ring electrically connect the ends of the conductor bars at the respective axial end surfaces of the laminated stack of electric steel sheets. The end rings and the conductor bars may be simultaneously cast in place. Alternatively, the first end ring and the second end ring may be cast in place from aluminum over the ends of pre-formed conductor bars that are positioned in the longitudinal grooves of the laminated stack.

SUMMARY

A rotor assembly for an electric device is provided. The rotor assembly includes a plurality of electric steel sheets. Each of the plurality of electric steel sheets defines a plurality of slots. The plurality of slots is disposed angularly about and equidistant from a central axis. The plurality of electric steel sheets are disposed adjacent each other to define a laminated stack having a first end surface and a second end surface. The second end surface is spaced from the first end surface along the central axis. The plurality of slots are aligned to define a plurality of longitudinal grooves in the laminated stack. The rotor assembly further includes a plurality of conductor bars. One of the plurality of conductor bars is disposed within each of the plurality of longitudinal grooves. Each of the plurality of conductor bars includes a first end extending axially beyond the first end surface of the laminated stack along the central axis. A first end ring is disposed against and abuts the first end surface. The first end ring at least partially surrounds and electrically connects the first end of each of the plurality of conductor bars. The first end of each of the plurality of conductor bars includes a textured surface having micro-sized surface irregularities mechanically interlocking with the first end ring.

A rotor assembly for an electric device is also provided. The rotor assembly includes a plurality of electric steel sheets. Each of the plurality of electric steel sheets defines a plurality of slots disposed angularly about and equidistant from a central axis. The plurality of electric steel sheets are disposed adjacent each other to define a laminated stack having a first end surface and a second end surface. The second end surface is spaced from the first end surface along the central axis. The plurality of slots are aligned to define a plurality of longitudinal grooves in the laminated stack extending along the central axis. The rotor assembly further includes a plurality of conductor bars. One of the plurality of conductor bars is disposed within each of the plurality of longitudinal grooves. Each of the plurality of conductor bars includes a first end and a second end. The first end of each of the plurality of conductor bars extends axially beyond the first end surface of the laminated stack along the central axis. The second end of each of the plurality of conductor bars extends axially beyond the second end surface of the laminated stack along the central axis. A first end ring is disposed against and abuts the first end surface, and at least partially surrounds and electrically connects the first end of each of the plurality of conductor bars. A second end ring is disposed against and abuts the second end surface, and at least partially surrounds and electrically connects the second end of each of the plurality of conductor bars. The first end and the second end of each of the plurality of conductor bars include a textured surface having micro-sized surface irregularities. The micro-sized surface irregularities of the textured surface mechanically interlock with the first end ring and the second end ring respectively. The first end ring and the second end ring are cast in place over the first ends and the second ends of the plurality of conductor bars respectively, and the conductor bars are pre-formed prior to casting the first end ring and the second end ring. The micro-sized surface irregularities of the textured surface include a roughness measured parallel with a longitudinal axis of the conductor bars that is less than 1 μm, and a amplitude measured perpendicular to the longitudinal axis of the conductor bars that is less than 50 μm.

A method of manufacturing a rotor assembly for an electric device is also provided. The method includes forming a plurality of conductor bars to define a textured surface having micro-sized surface irregularities in a first end of each of the plurality of conductor bars. The method further includes laminating a plurality of electric steel sheets to define a laminated stack having a first end surface and a second end surface axially spaced from the first end surface along a central axis, and a plurality of longitudinal grooves extending along the central axis between the first end surface and the second end surface. The plurality of grooves are angularly spaced about and equidistant from the central axis. The method further includes positioning one of the plurality of conductor bars in each of the plurality of longitudinal grooves such that the first end of each of the plurality of conductor bars extend outward beyond the first end surface of the laminated stack. The method further includes casting a first end ring in place around the micro-sized surface irregularities of the textured surface of the first end of each of the plurality of conductor bars to at least partially surround and electrically connect the first end of each of the plurality of conductor bars.

Accordingly, the micro-sized surface irregularities of the textured surface in the first end and the second end of each of the conductor bars mechanically interlock with the cast in place first end ring and the cast in place second end ring respectively, to provide a stronger mechanical connection therebetween and improve the electrical connection between each of the conductor bars and the first end ring and the second end ring.

The above features and advantages and other features and advantages of the present invention are readily apparent from the following detailed description of the best modes for carrying out the invention when taken in connection with the accompanying drawings.

DETAILED DESCRIPTION

Referring to the Figures, wherein like numerals indicate like parts throughout the several views, a rotor assembly is shown generally at 20. The rotor assembly 20 is for an electric device, including but not limited to an induction electric motor. The rotor assembly 20 may commonly be referred to as a squirrel cage type rotor assembly 20.

Figure 1:
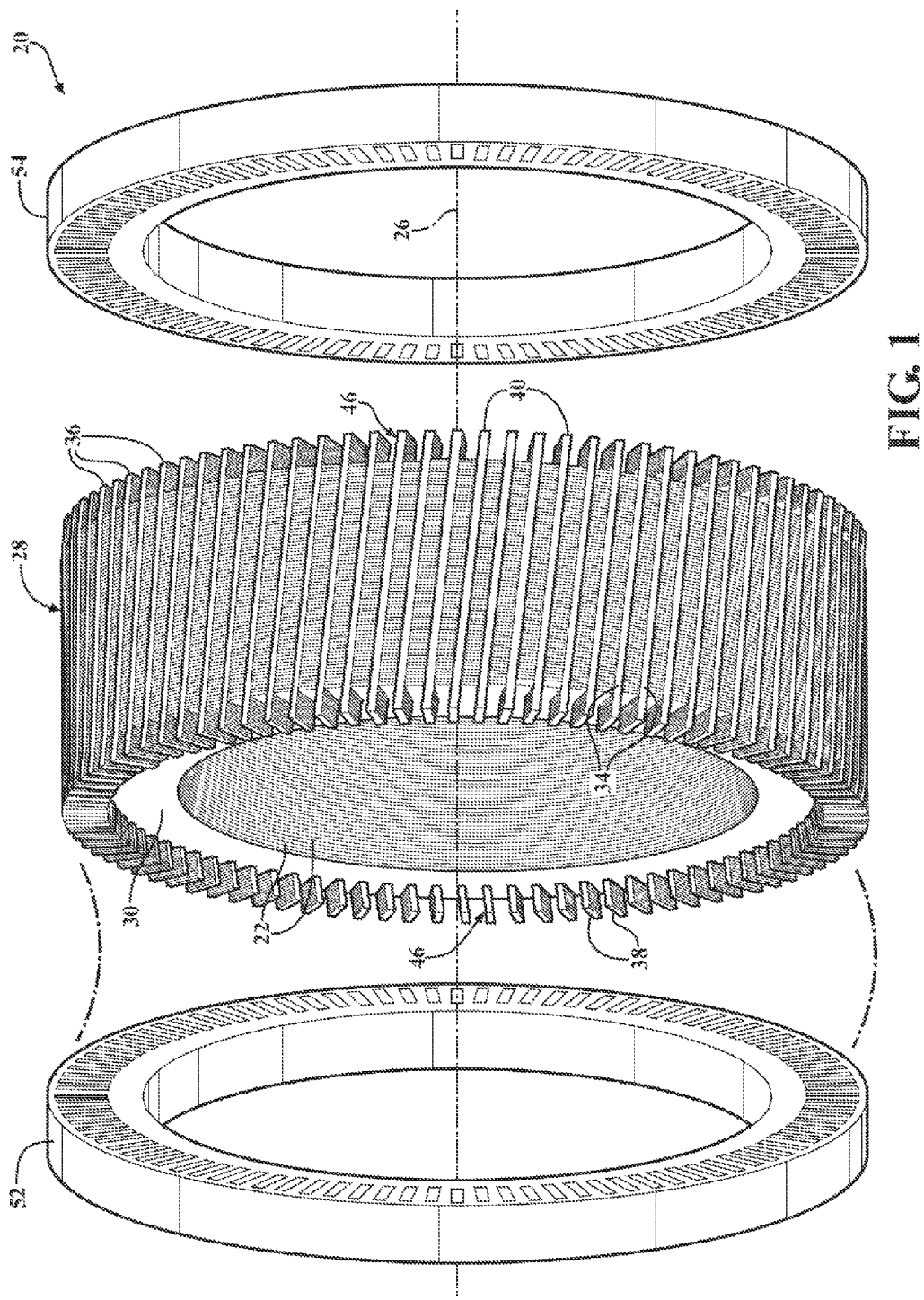
FIG. 1 is a schematic exploded perspective view of a rotor assembly.
Figure 3:
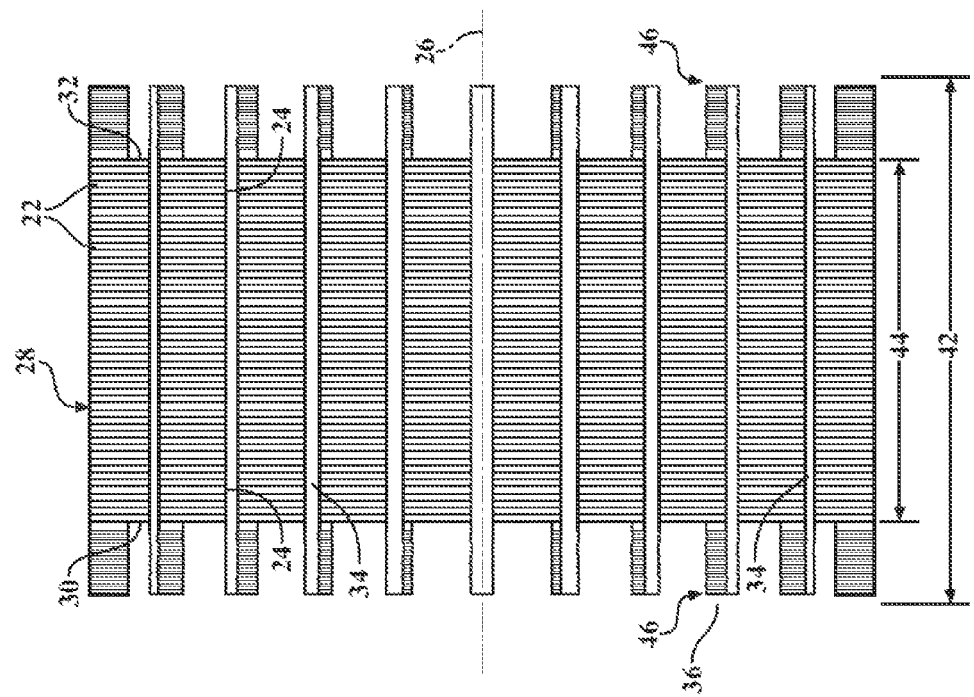
FIG. 3 is a schematic plan view of a laminated stack of the electric steel sheets.
Figure 2:
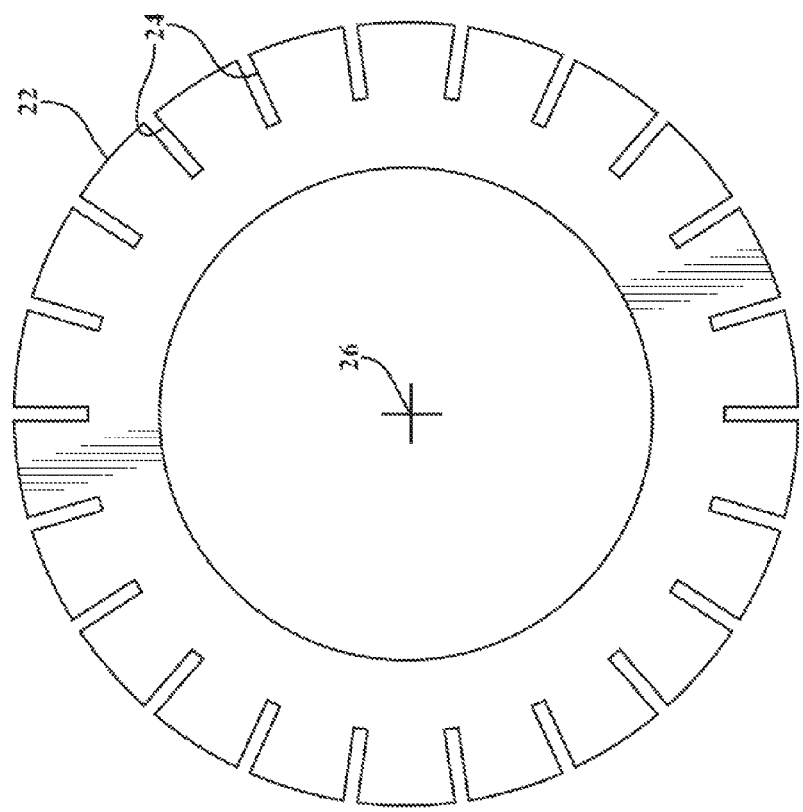
FIG. 2 is a schematic plan view of an electric steel sheet of the rotor assembly.

The rotor assembly 20 includes a plurality of electric steel sheets 22. Referring to FIG. 2, each of the electric steel sheets 22 defines a plurality of slots 24. The slots 24 are disposed angularly about and equidistant from a central axis 26, near an outer periphery of the electric steel sheets 22. Referring to FIGS. 1 and 3, the electric steel sheets 22 are disposed adjacent each other and concentric about the central axis 26 to define a laminated stack 28. The laminated stack 28 includes a first end surface 30 and a second end surface 32. The second end surface 32 is spaced from the first end surface 30 along the central axis 26. The first end surface 30 and the second end surface 32 define opposing axial end surfaces of the laminated stack 28 of electric steel sheets 22. The slots 24 are aligned to define a plurality of longitudinal grooves 34 in the laminated stack 28. The longitudinal grooves 34 extend between and connect the first end surface 30 and the second end surface 32. As is known, the longitudinal grooves 34 may be slightly skewed along a length of the laminated stack 28 of electric steel sheets 22. The electric steel sheets 22 may include and be manufactured from, but are not limited to, a low carbon iron having a high silicon content to reduce eddie current loss, and may be coated with an insulating compound to reduce circulating current that may result in further eddie current loss.

The rotor assembly 20 further includes a plurality of conductor bars 36. One of the conductor bars 36 is disposed within each of the plurality of longitudinal grooves 34. The conductor bars 36 may include and be manufactured from, but are not limited to pure aluminum, a wrought aluminum alloy, an aluminum composite, copper, a copper alloy, or some other conductive material. Each of the plurality of conductor bars 36 includes a first end 38 and a second end 40. The first end 38 extends axially beyond the first end surface 30 of the laminated stack 28 along the central axis 26. The second end 40 extends axially beyond the second end surface 32 of the laminated stack 28 along the central axis 26. Accordingly, it should be appreciated that the conductor bars 36 include a conductor length 42 along the central axis 26 that is greater than a stack length 44 of the laminated stack 28 of electric steel sheets 22 along the central axis 26.

Each of the conductor bars 36 may include a uniform cross sectional shape perpendicular to the central axis 26 between the first end surface 30 and the second end surface 32 of the laminated stack 28. As shown, the uniform cross sectional shape of the conductor bars 36 between the first end surface 30 and the second end surface 32 includes a rectangular shape. However, it should be appreciated that the uniform cross sectional shape may include some other shape not shown or described herein.

Figure 4:
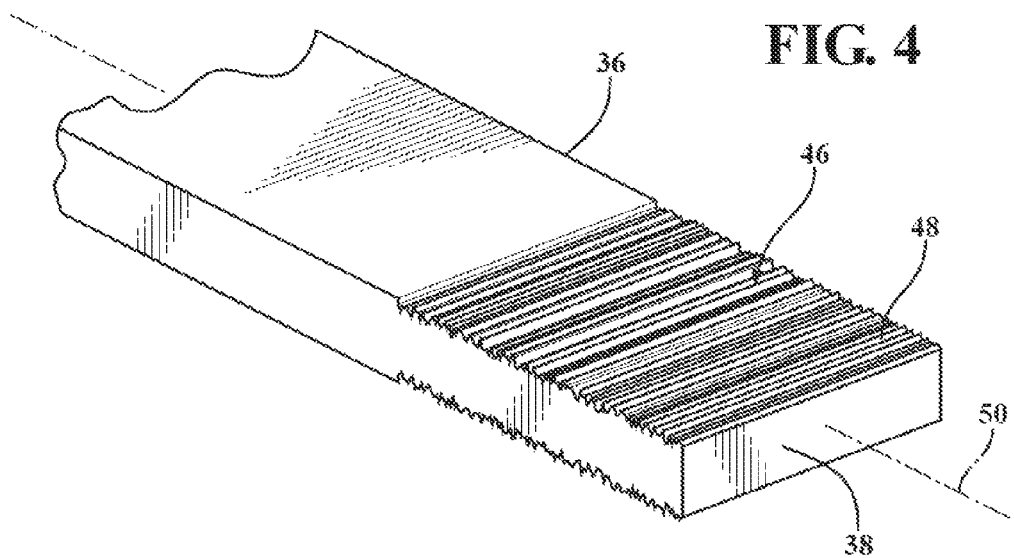
FIG. 4 is an enlarged schematic perspective view of an end of a conductor bar.

Referring to FIG. 4, the first end 38 and the second end 40 of each of the conductor bars 36 include a textured surface 46 having micro-sized surface irregularities 48. Micro-sized as used herein includes feature dimensions between the range of 0.001 µm and 100 µm, and that are smaller than a normal scale of focus, i.e., features that are only visible when magnified. The micro-sized surface irregularities 48 in the textured surface 46 may include any suitable surface irregularity and/or deformation capable of mechanically interlocking with a cast in place end ring, including but not limited to grooves 34, valleys, crests, ridges, waves, etc.

The micro-sized surface irregularities 48 of the textured surface 46 include a roughness measured parallel with a longitudinal axis 50 of the conductor bars 36. Preferably, the roughness is less than 1 µm. More preferably, the roughness of the micro-sized surface irregularities 48 of the textured surface 46 is less than 0.5 µm.

Additionally, micro-sized surface irregularities 48 of the textured surface 46 include a amplitude measured perpendicular to the longitudinal axis 50 of the conductor bars 36. Preferably, the amplitude is less than 50 µm. More preferably, the amplitude of the micro-sized surface irregularities 48 of the textured surface 46 is less than 5 µm. However, it should be appreciated that the roughness and the amplitude of the micro-sized surface irregularities 48 may be greater than the values described above.

Figure 5:
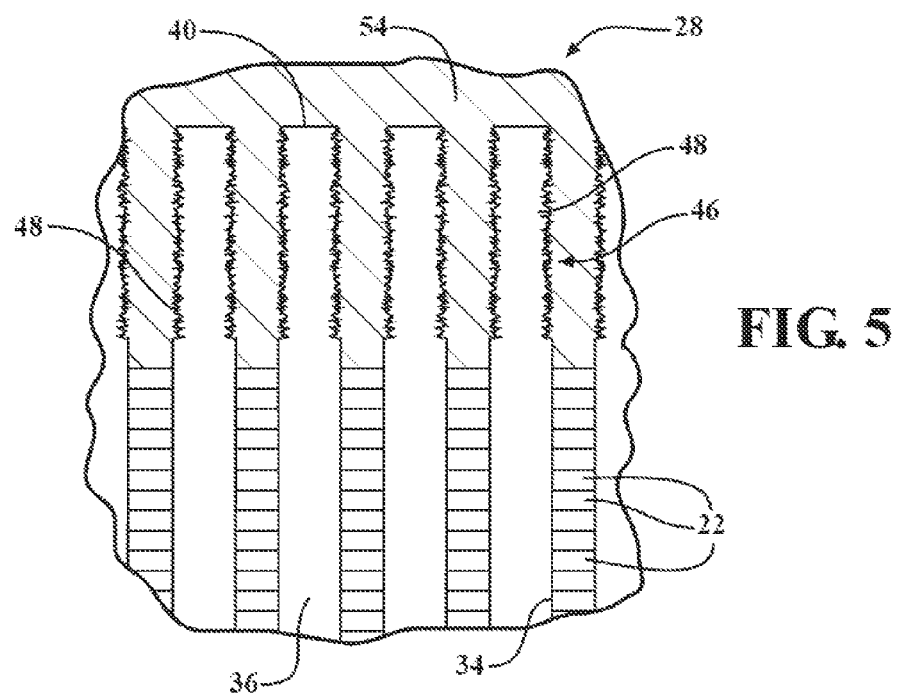
FIG. 5 is an enlarged schematic fragmentary top plan view of the rotor assembly.

Referring to FIGS. 1 and 5, the second end ring 54 is disposed against and abuts the first end surface 30 of the laminated stack 28 of electric steel sheets 22. The second end ring 54 at least partially surrounds and electrically connects the first end 38 of each of the conductor bars 36. Similarly, the first end ring 52 (shown only in FIG. 1) is disposed against and abuts the second end surface 32 of the laminated stack 28 of electric steel sheets 22. The first end ring 52 at least partially surrounds and electrically connects the second end 40 of each of the conductor bars 36.

The first end ring 52 and the second end ring 54 are each cast in place over the first ends 38 of the conductor bars 36 and the second ends 40 of the conductor bars 36 respectively. Preferably, the first end ring 52 and the second end ring 54 are cast in place from pure aluminum or a cast aluminum alloy. However, it should be appreciated that the first end ring 52 and the second end ring 54 may be cast in place from some other conductive material. The first end ring 52 and the second end ring 54 may be cast using any suitable casting process known to those skilled in the art, including but not limited to a squeeze casting process, a high pressure die casting process, a low pressure die casting process or a sand casting process.

The micro-sized surface irregularities 48 of the textured surface 46 at the first end 38 of each of the conductor bars 36 mechanically interlocks with the cast in place first end ring 52. Similarly, the micro-sized surface irregularities 48 of the textured surface 46 at the second end 40 of each of the conductor bars 36 mechanically interlock with the second end ring 54.

The micro-sized surface irregularities 48 of the textured surface 46 are micro-sized geometric features that allow the cast in place material of the first end ring 52 and the second end ring 54 to flow into the micro-sized surface irregularities 48 of the textured surface 46 and mechanically interlocks with the micro-sized surface irregularities 48 of the textured surface 46, thereby improving the mechanical and electrical bond between the conductor bars 36 and the first end ring 52 or the second end ring 54. The minimum radius of the micro-sized surface irregularities 48 of the textured surface 46 may be determined by Equation 1:

$$R = \frac{2\gamma}{P} \quad (1)$$

wherein R is the minimum radius of the micro-sized surface irregularities 48 measured in micrometers, γ is the surface tension of the liquid material used to cast the first end ring 52 and/or the second end ring 54 measured in N/m, and P is the pressure applied to the liquid material during solidification measured in N/m. The minimum radius of the micro-sized surface irregularities 48 is the minimum size that will allow the liquid material forming the first end ring 52 and/or the second end ring 54 to fully flow into and fill up the micro-sized surface irregularities 48 of the textured surface 46, thereby ensuring a proper mechanical locking bond between the micro-sized surface irregularities 48 of the textured surface 46 and the cast in place first end ring 52 and/or second end ring 54.

At one atmosphere pressure, such as with the gravity poured sand casting process, the minimum radius R of the micro-sized surface irregularities 48 must be larger than 18 µm. However, under higher pressure, such as at a pressure equal to 10,000 psi achieved during the high pressure die casting process, the minimum radius R of the micro-sized surface irregularities 48 must be larger than only 0.027 µm.

A method of manufacturing the rotor assembly 20 is also disclosed. The method includes laminating the plurality of electric steel sheets 22 together to define the laminated stack 28. As described above, the laminated stack 28 includes the first end surface 30 and the second end surface 32. The second end surface 32 is axially spaced from the first end surface 30 along the central axis 26. The electric steel sheets 22 are laminated together in such a manner so that the slots 24 in each of the electric steel sheets 22 cooperate together to define the longitudinal grooves 34 extending along the central axis 26, between the first end surface 30 and the second end surface 32, with the grooves 34 angularly spaced about and equidistant from the central axis 26.

The method further includes forming the conductor bars 36. The conductor bars 36 are formed to include the conductor length 42 greater than the stack length 44 of the laminated stack 28 of electric steel sheets 22 so that the first end 38 and the second end 40 of each of the conductor bars 36 extend outward beyond the first end surface 30 and the second end surface 32 respectively. The conductor bars 36 are also formed to define the micro-sized surface irregularities 48 in the textured surface 46 in the first end 38 and the second end 40 of each of the conductor bars 36. The micro-sized surface irregularities 48 in the textured surface 46 may be formed in any suitable manner, including but not limited to a water jet cutting process or an electrical/mechanical polishing process as is known to those skilled in the art. The conductor bars 36, and particularly the micro-sized surface irregularities 48 in the textured surface 46 are pre-formed prior to casting the first end ring 52 and/or the second end ring 54 over the first ends 38 and the second ends 40 of the conductor bars 36.

The method further includes positioning one of the conductor bars 36 in each of the longitudinal grooves 34. The conductor bars 36 are positioned such that the first end 38 and the second end 40 of each of the plurality of conductor bars 36 extend outward beyond the first end surface 30 and the second end surface 32 of the laminated stack 28 respectively.

The method further includes placing the laminated stack 28 with the plurality of conductor bars 36 positioned therein in a form. The form defines the first end ring 52 and/or the second end ring 54. The form may include any suitable shape and/or size for casting the first end ring 52 and/or the second end ring 54, and may depend upon the casting process utilized to cast the first end ring 52 and/or the second end ring 54.

The method further includes casting the first end ring 52 in place around the micro-sized surface irregularities 48 in the textured surface 46 of the first end 38 of each of the plurality of conductor bars 36, and casting the second end ring 54 in place around the micro-sized surface irregularities 48 in the textured surface 46 of the second end 40 of each of the plurality of conductor bars 36. The first end ring 52 and the second end ring 54 are cast to at least partially surround and electrically connect the first end 38 of each of the plurality of conductor bars 36 with the first end ring 52, and to at least partially surround and electrically connect the second end 40 of each of the plurality of conductor bars 36 with the second end ring 54.

Casting the first end ring 52 and/or the second end ring 54 includes injecting molten material into the form and around the micro-sized surface irregularities 48 in the textured surface 46 in the first end 38 of each of the plurality of conductor bars 36 and/or the micro-sized surface irregularities 48 in the textured surface 46 in the second end 40 of each of the conductor bars 36. Preferably, the first end ring 52 and the second end ring 54 are cast from aluminum or an aluminum alloy. However, some other conductive material may be utilized. Casting the first end ring 52 and/or the second end ring 54 may further include flowing the molten material into and around the micro-sized surface irregularities 48 in the textured surface 46 to mechanically interlock with the micro-sized surface irregularity of the textured surface 46 upon solidification.

Casting the first end ring 52 and/or the second end ring 54 may further include compressing the molten material as the molten material solidifies. Compressing the molten material as the molten material solidifies during the casting process reduces the porosity in the finished cast in place product, as well as improves mechanical properties of the finished product.

The method may further include vibrating each of the conductor bars 36 at an ultrasonic frequency for a pre-defined period of time during solidification of the molten material of the cast in place first end ring 52 and/or second end ring 54. Preferably, the ultrasonic frequency is approximately equal to or greater than 20 kHz. The conductor bars 36 may be vibrated for a period of time of less than 20 seconds, and more preferably for a period of time equal to between 5 seconds and 10 seconds. Vibrating the conductor bars 36 during solidification of the molten material during the casting process may break up any aluminum oxides disposed on an outer surface of the first ends 38 and the second ends 40 of the conductor bars 36, and improves the wetting between the liquid molten material used in the casting process and the pre-formed conductor bars 36.

While the best modes for carrying out the invention have been described in detail, those familiar with the art to which this invention relates will recognize various alternative designs and embodiments for practicing the invention within the scope of the appended claims.

The invention claimed is:

1. A rotor assembly for an electric device, the rotor assembly comprising:
    a plurality of electric steel sheets each defining a plurality of slots disposed angularly about and equidistant from a central axis, wherein the plurality of electric steel sheets are disposed adjacent each other to define a laminated stack having a first end surface and a second end surface spaced from the first end surface along the central axis, with the plurality of slots aligned to define a plurality of longitudinal grooves in the laminated stack;

a plurality of conductor bars, with one of the plurality of conductor bars disposed within each of the plurality of longitudinal grooves, wherein each of the plurality of conductor bars includes a first end extending axially beyond the first end surface of the laminated stack along the central axis; and a first end ring disposed against and abutting the first end surface and at least partially surrounding and electrically connecting the first end of each of the plurality of conductor bars;

wherein the first end of each of the plurality of conductor bars includes a textured surface having micro-sized surface irregularities mechanically interlocking with the first end ring;

wherein the micro-sized surface irregularities of the textured surface include a minimum radius R defined by the equation:

$$R = \frac{2\gamma}{P}$$

wherein γ is the surface tension of a liquid material used to cast the first end ring and/or the second end ring, and P is the pressure applied to the liquid material during solidification.

2. A rotor assembly as set forth in claim 1 wherein each of the plurality of conductor bars includes a second end extending axially beyond the second end surface of the laminated stack along the central axis, and further comprising a second end ring disposed against and abutting the second end surface and at least partially surrounding and electrically connecting the second end of each of the plurality of conductor bars, wherein the second end of each of the plurality of conductor bars includes a textured surface having micro-sized surface irregularities mechanically interlocking with the second end ring.

3. A rotor assembly as set forth in claim 2 wherein the first end ring and the second end ring are each cast in place over the first end and the second end of each of the plurality of conductor bars.

4. A rotor assembly as set forth in claim 3 wherein the first end ring and the second end ring include and are manufactured from one of a pure aluminum, a conductor grade aluminum wrought alloy, a cast aluminum alloy, or a combination thereof.

5. A rotor assembly as set forth in claim 1 wherein the micro-sized surface irregularities of the textured surface include a roughness measured parallel with a longitudinal axis of the conductor bars that is less than 1 μm, and a amplitude measured perpendicular to the longitudinal axis of the conductor bars that is less than 50 μm.

6. A rotor assembly as set forth in claim 5 wherein the roughness of the micro-sized surface irregularities of the textured surface is less than 0.5 μm.

7. A rotor assembly as set forth in claim 5 wherein the amplitude of the micro-sized surface irregularities of the textured surface is less than 5 μm.

8. A rotor assembly for an electric device, the rotor assembly comprising:

a plurality of electric steel sheets each defining a plurality of slots disposed angularly about and equidistant from a central axis, wherein the plurality of electric steel sheets are disposed adjacent each other to define a laminated stack having a first end surface and a second end surface spaced from the first end surface along the central axis, with the plurality of slots aligned to define a plurality of longitudinal grooves in the laminated stack extending along the central axis;

a plurality of conductor bars, with one of the plurality of conductor bars disposed within each of the plurality of longitudinal grooves, wherein each of the plurality of conductor bars includes a first end extending axially beyond the first end surface of the laminated stack along the central axis, and a second end extending axially beyond the second end surface of the laminated stack along the central axis;

a first end ring disposed against and abutting the first end surface and at least partially surrounding and electrically connecting the first end of each of the plurality of conductor bars; and a second end ring disposed against and abutting the second end surface and at least partially surrounding and electrically connecting the second end of each of the plurality of conductor bars;

wherein the first end and the second end of each of the plurality of conductor bars include a textured surface having micro-sized surface irregularities mechanically interlocking with the first end ring and the second end ring respectively, with the first end ring and the second end ring cast in place over the first ends and the second ends of the plurality of conductor bars respectively, and the conductor bars are pre-formed prior to casting the first end ring and the second end ring; and wherein the micro-sized surface irregularities of the textured surface include a roughness measured parallel with a longitudinal axis of the conductor bars that is less than 1 μm, and a amplitude measured perpendicular to the longitudinal axis of the conductor bars that is less than 50 μm.

9. A method of manufacturing a rotor assembly for an electric device, the method comprising:

forming a plurality of conductor bars to define a textured surface having micro-sized surface irregularities in a first end of each of the plurality of conductor bars;

laminating a plurality of electric steel sheets to define a laminated stack having a first end surface and a second end surface axially spaced from the first end surface along a central axis, and a plurality of longitudinal grooves extending along the central axis between the first end surface and the second end surface, wherein the plurality of longitudinal grooves are angularly spaced about and equidistant from the central axis;

positioning one of the plurality of conductor bars in each of the plurality of longitudinal grooves such that the first end of each of the plurality of conductor bars extend outward beyond the first end surface of the laminated stack;

casting a first end ring in place around the micro-sized surface irregularities of the textured surface of the first end of each of the plurality of conductor bars to at least partially surround and electrically connect the first end of each of the plurality of conductor bars; and vibrating each of the conductor bars at an ultrasonic frequency for a pre-defined period of time, wherein the ultrasonic frequency is greater than 20 kHz.

10. A method as set forth in claim 9 wherein the pre-defined period of time is less than 20 seconds.

11. A method as set forth in claim 9 wherein casting a first end ring includes flowing molten material into and around the micro-sized surface irregularity of the textured surface to mechanically interlock with the micro-sized surface irregularity of the textured surface upon solidification.

12. A method as set forth in claim 9 wherein the first end ring is cast from one of pure aluminum or an aluminum alloy.

13. A method as set forth in claim 9 further comprising placing the laminated stack with the plurality of conductor bars positioned therein in a form defining the first end ring.

14. A method as set forth in claim 13 wherein casting the first end ring includes injecting molten material into the form and around the micro-sized surface irregularities in the textured surface in the first end of each of the plurality of conductor bars.

15. A method as set forth in claim 14 wherein casting the first end ring includes compressing the molten material as the molten material solidifies.

16. A method as set forth in claim 9 wherein casting the first end ring is further defined as casting the first end ring with one of a high pressure die casting process, a low pressure die casting process, a sand casting process or a squeeze casting process.

* * * * *